(12) United States Patent
Shuman et al.

(10) Patent No.: US 8,376,857 B1
(45) Date of Patent: Feb. 19, 2013

(54) MULTI-PLAYER ONLINE GAME PLAYER PROXIMITY FEATURE

(75) Inventors: Michael V. Shuman, Chicago, IL (US); Kurt Brooks Uhlir, Chicago, IL (US)

(73) Assignee: Navteq B.V., Veldhoven (NL)

( * ) Notice: Subject to any disclaimer, the term of this patent is extended or adjusted under 35 U.S.C. 154(b) by 1299 days.

(21) Appl. No.: 11/414,567

(22) Filed: Apr. 28, 2006

(51) Int. Cl.
A63F 9/24 (2006.01)
(52) U.S. Cl. .......................................................... 463/42
(58) Field of Classification Search ...................... 463/42
See application file for complete search history.

(56) References Cited

U.S. PATENT DOCUMENTS

| | | | |
|---|---|---|---|
| 2,026,082 A | 12/1935 | Darrow | 273/134 |
| 5,526,479 A | 6/1996 | Barstow et al. | 395/152 |
| 5,573,402 A | 11/1996 | Gray | 434/69 |
| 5,616,079 A | 4/1997 | Iwase et al. | 463/32 |
| 5,894,556 A * | 4/1999 | Grimm et al. | 709/227 |
| 6,173,277 B1 | 1/2001 | Ashby et al. | 707/1 |
| 6,183,364 B1 | 2/2001 | Trovato | 463/32 |
| 6,183,634 B1 | 2/2001 | Du Toit et al. | 201/94 |
| 6,401,033 B1 | 6/2002 | Paulauskas et al. | 701/207 |
| 6,509,869 B2 | 1/2003 | Aoyama | 342/357.13 |
| 6,549,768 B1 * | 4/2003 | Fraccaroli | 455/456.3 |
| 6,612,925 B1 | 9/2003 | Forsberg | 463/6 |
| 6,618,593 B1 * | 9/2003 | Drutman et al. | 455/456.3 |
| 6,677,858 B1 | 1/2004 | Faris et al. | 340/573.1 |
| 7,143,130 B2 | 11/2006 | Lin | 709/203 |
| 7,534,169 B2 * | 5/2009 | Amaitis et al. | 463/39 |
| 2002/0063654 A1 | 5/2002 | Aoyama | 342/357.13 |
| 2002/0187831 A1 | 12/2002 | Arikawa et al. | 463/32 |
| 2003/0195023 A1 | 10/2003 | Di Cesare | 463/9 |
| 2004/0235493 A1 * | 11/2004 | Ekerborn | 455/456.1 |
| 2005/0177614 A1 * | 8/2005 | Bourne | 709/200 |
| 2005/0202861 A1 | 9/2005 | Dougherty et al. | 463/1 |
| 2005/0202862 A1 | 9/2005 | Shuman et al. | 463/9 |
| 2005/0202877 A1 | 9/2005 | Uhlir et al. | 463/143 |
| 2005/0203922 A1 | 9/2005 | Uhlir et al. | 707/100 |
| 2006/0270419 A1 * | 11/2006 | Crowley et al. | 455/456.2 |
| 2007/0220103 A1 | 9/2007 | Rogers et al. | 709/217 |

FOREIGN PATENT DOCUMENTS

| | | |
|---|---|---|
| EP | 1 107 189 | 6/2001 |
| WO | WO 02/26518 A1 | 4/2002 |
| WO | WO 02/39363 A1 | 5/2002 |

OTHER PUBLICATIONS

Yuan, Li and Buckman, Rebecca, "Social Networking Goes Mobile—MySpace, Facebook Strike Deals with Cell Companies; A New Set of Safety Concerns", Wall Street Journal, Apr. 4, 2006.
Wingfield, Nick, "Beyond Brick Breaker", Wall Street Journal, Apr. 4, 2006.
Quick, After Him: Pac-Man WentThataway, The New York Times, Section 9—Sunday Styles, pp. 1 and 11. (May 9, 2004).
Pac Manhattan, http://pacmanhattan.com/yourcity.php, pp. 1-3, (2004).

(Continued)

Primary Examiner — Corbett B Coburn

(57) ABSTRACT

A method of operation for a multi-player online computer game that is played by users involves portable wireless game-playing devices. Each of the portable wireless game-playing devices is located at a respective corresponding physical geographic position. Information that indicates the respective corresponding physical geographic position of each of the portable wireless game playing devices is obtained. This information is used to bring a user of one of the portable wireless game playing devices into physical proximity with other users of portable wireless game playing devices so that a plurality of users of portable wireless game playing devices are participating in the multi-player online game in physical proximity to each other.

17 Claims, 3 Drawing Sheets

OTHER PUBLICATIONS

Map Quests, Wired, p. 052 (Feb. 2004).
Klaus, Todd; Terra Scene V2.0, TerraScene Scenery Generation System—Tutorials and Reference Guide; XP002335169, pp. 1-63; http://library.avsim.net/sendfile.php?; Apr. 2004.
Freedman, Jonah, *Map Quests*, XP002335320, 1 page, http://www.wired.com/wired/archive/12.02/play_pr.html> Feb. 2002.
*Microsoft Flight Simulator 2002 Software Development Kit*; Autogen, XP002335786, pp. 4, 6-8, http://microsoft.com/games/flightsimulator/fs2002_downloads_sdk.asp#scenery>; Apr. 2002.
Muller, Chris; Denney, Eddie; *AVSIM Commercial Scenery Review*; Real Scene U.S. Terrain Mesh Scenery for FS2002; XP002335787, entire document; http://www.avsim.com/pages/0402/realscene_terrainmesh/rs_us_tms.html; Apr. 2002.
*3D Nature*: "What is Nature Studio" EP002335442, entire document http://web/archive.org/web/20040202220153; http://wwww.3dnature.com/vnsinfo.html>, Feb. 2004.
3D Nature PLC, LTD.; "Comparison of features" *World Construction Set, Visual Nature Studio*, 'Online!', XP0023335684, http://web.archive.org/web/20031206133238/http://www.3dnature/com/comparingfeatures.html>, entire document (Dec. 2003).
Cable, Tim; Klaus, Todd; *AVSIM Freeware Utility Review*, Terra Scene, XP002335170, entire document, http://avsim.com/pages/0500/terrascene/terrascene.shtml> May 2000.
Koller et al., "Virtual GIS: A Real-Time 3D Geographic Information System", *Proceedings of $6^{th}$ IEEE Visualization Conference*, XP002335667, pp. 94-100 (Oct. 1995).

* cited by examiner

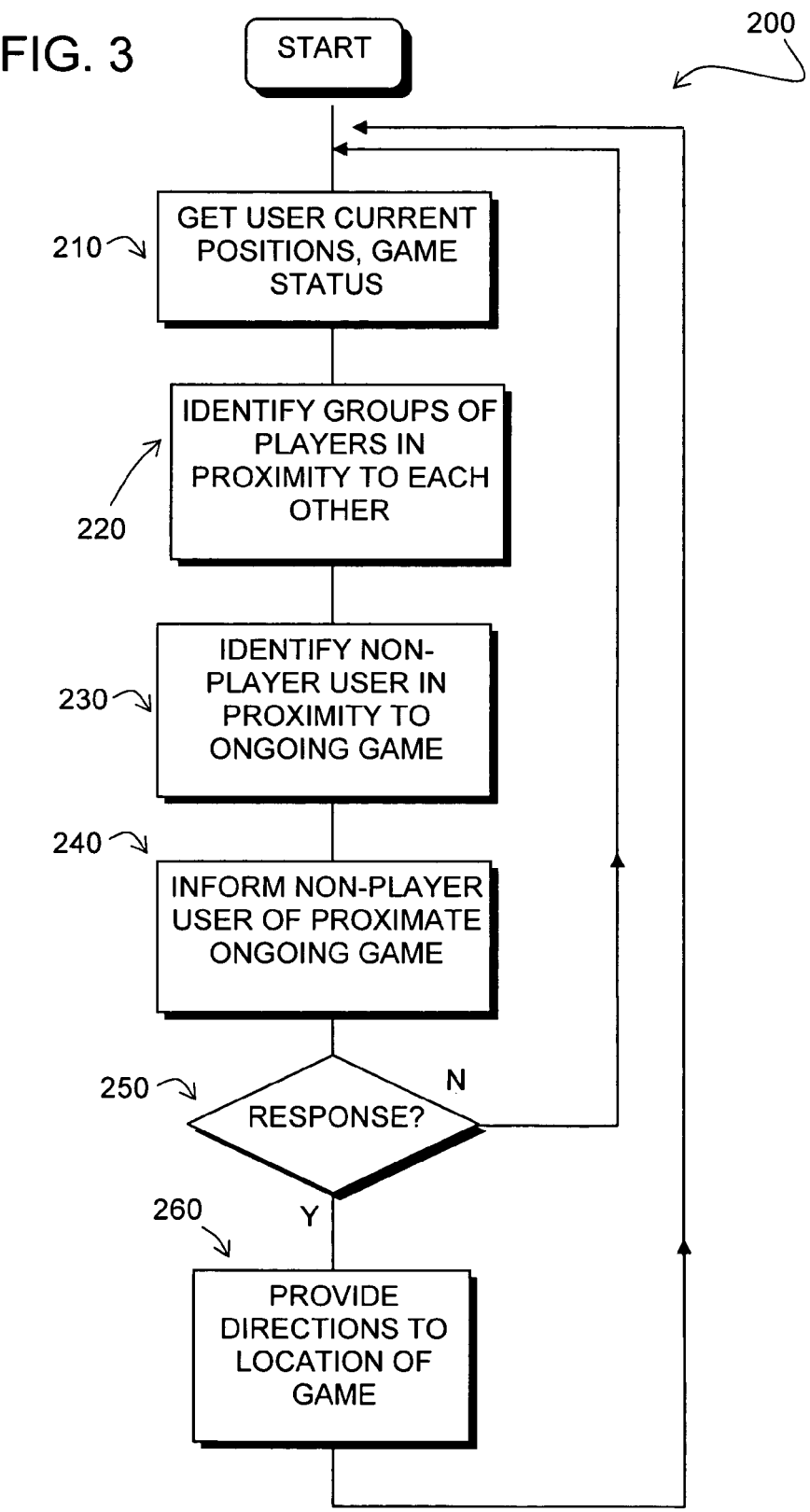

MULTI-PLAYER ONLINE GAME PLAYER PROXIMITY FEATURE

BACKGROUND OF THE INVENTION

The present invention relates to a feature for multi-player online games and in particular to multi-player online games that users play using portable game playing devices.

Online computer games have advanced in popularity and sophistication. One of the reasons for the popularity of online computer games is that a user can participate in games with many other users. Some online computer games can be played from portable devices, such as personal digital assistants ("PDAs") or mobile phones. These kinds of devices allow users to play online games from any location.

For some types of online games, the playing experience may be enhanced by specific proximities to other players.

Accordingly, there exists room for improvements for online games that users play using portable game playing devices.

SUMMARY OF THE INVENTION

To address these and other objectives, the present invention includes a method of operation for a multi-player online computer game. The game is played by users on portable wireless game-playing devices. Each of the portable wireless game-playing devices is located at a respective corresponding physical geographic position. Information that indicates the respective corresponding physical geographic position of each of the portable wireless game playing devices is obtained. This information is used to bring a user of one of the portable wireless game playing devices into physical proximity with other users of portable wireless game playing devices so that a plurality of users of portable wireless game playing devices are participating in the multi-player online game in physical proximity to each other.

BRIEF DESCRIPTION OF THE DRAWINGS

FIG. 3 is a flowchart showing steps in a process performed by the first embodiment.

DETAILED DESCRIPTION OF THE PRESENTLY PREFERRED EMBODIMENTS

Figure 1:
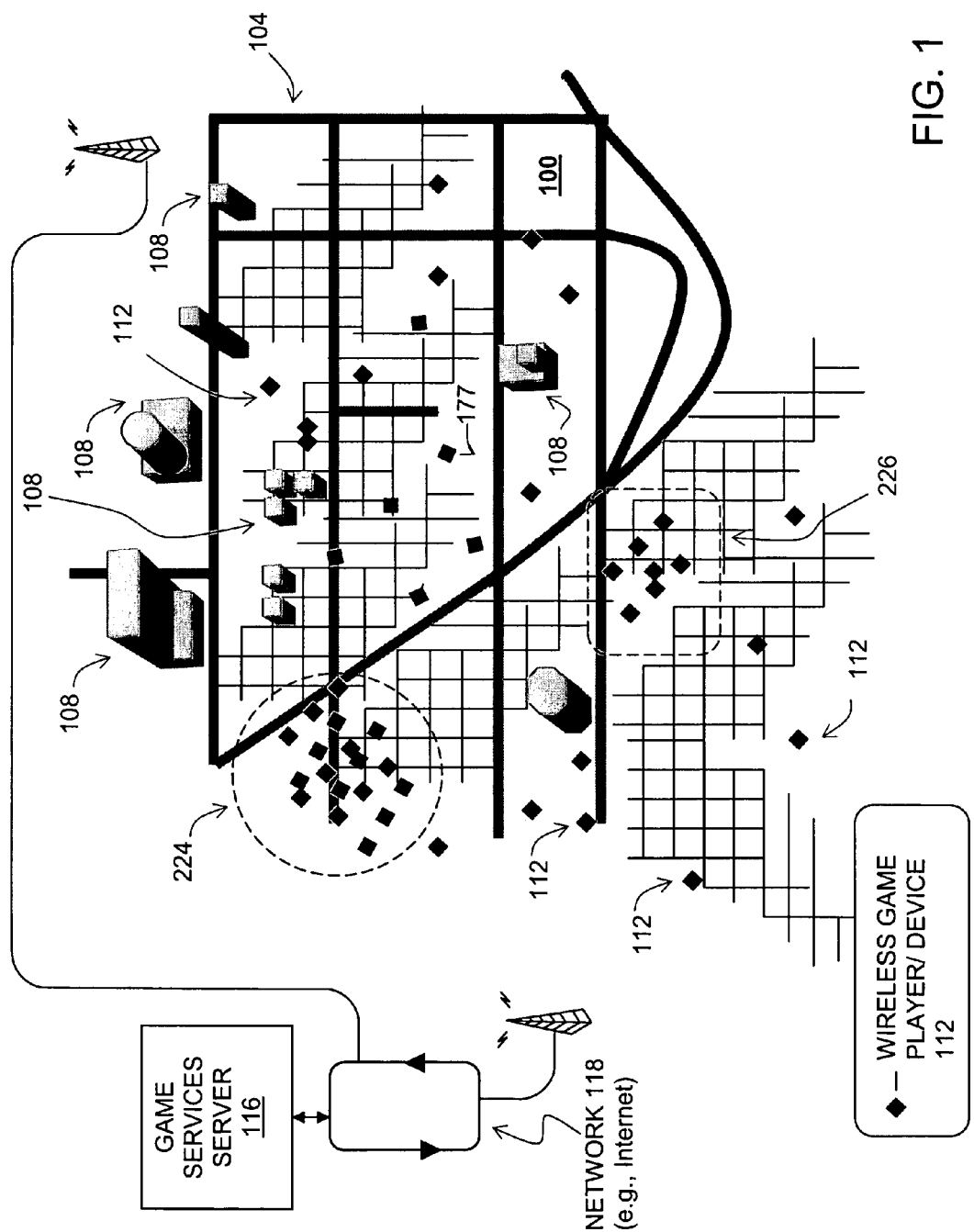
FIG. 1 is a block diagram showing components of an overall system according to a first embodiment.

FIG. 1 shows a geographic area 100. The geographic area 100 may be a portion of a city, state or country. The geographic area 100 may include roads 104 and buildings 108. Located in the geographic area 100 are a plurality of users of portable wireless game playing devices 112. The portable wireless game playing devices 112 may be implemented on various different hardware and/or software platforms. For example, the different types of portable wireless game playing devices 112 may include conventional mobile phones, general purpose PDAs ("personal digital assistants"), and dedicated game playing devices. A game services server 116 supports the users of the portable game playing devices 112 located in the area 100. The game services server 116 may be located in the geographic area 100 or may be located remotely from the geographic area 100. The users of the wireless game playing devices 112 communicate with the game services server 116 over a network 118, at least a part of which includes a wireless network. The wireless portion of the network may be implemented using any technology or combination of technologies, including cellular, satellite, Bluetooth, WiFi, and so on. The network 118 provides for the exchange of data between the users of the wireless game playing devices 112 and the game services server 116.

Figure 2:
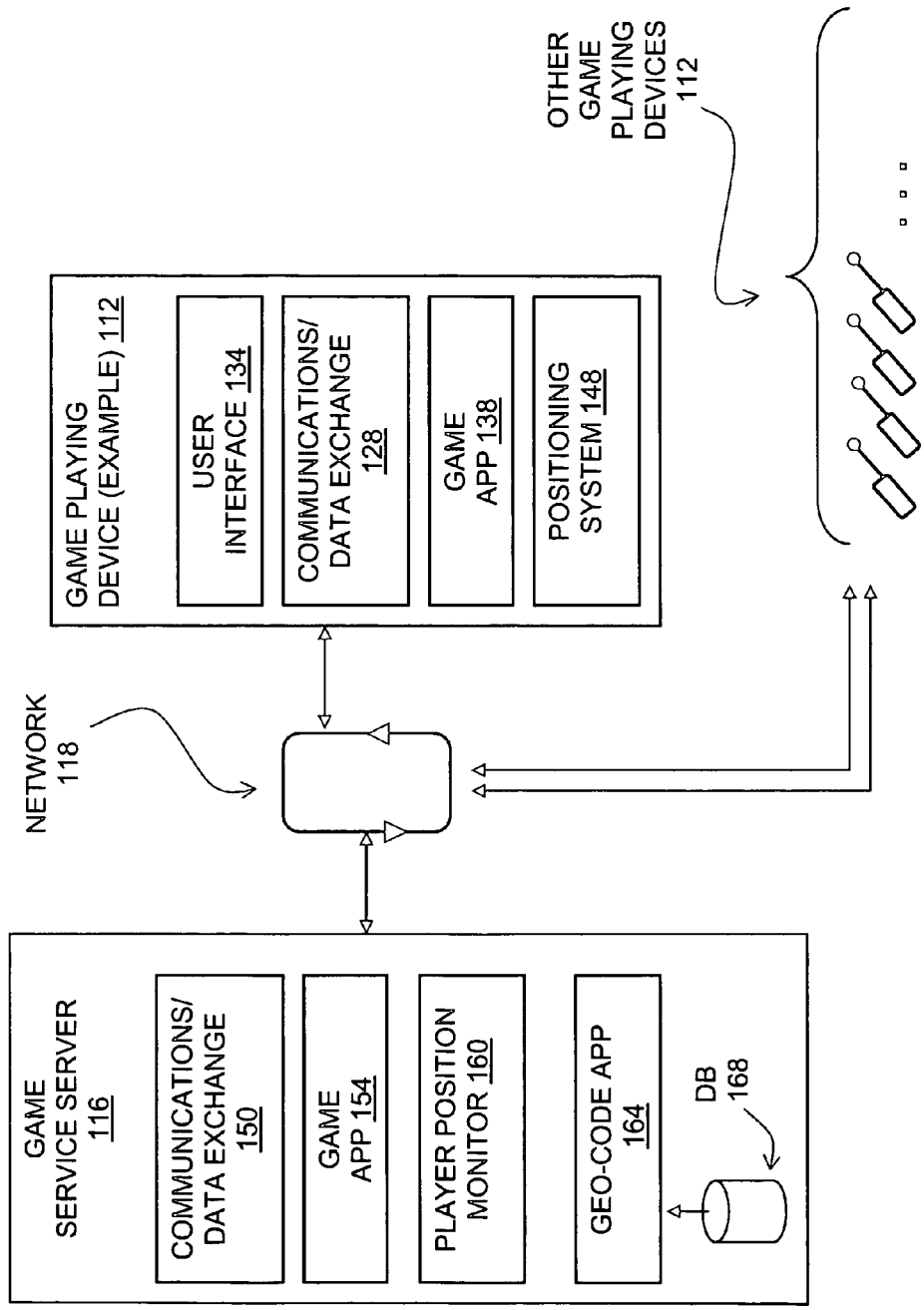
FIG. 2 block diagram showing a system for performing one of the steps of FIG. 1.

FIG. 2 is a diagram that shows components of one of the game playing devices 112 and the game services server 116 in FIG. 1. The game playing device 112 shown in FIG. 2 is a representative example of a wireless game playing device and is intended to depict only some of the components of the device. It is recognized that there may be various different types of devices with different kinds of components that can be operated by users to participate in multi-player online games.

The exemplary device in FIG. 2 includes hardware and software 128 for exchanging data over the network 118 with the remotely located game services server 116. In addition, the device 112 in FIG. 2 includes a user interface 134 for conveying information to and receiving information from the user. The user interface 134 may include a display screen, a keypad, a speaker, a microphone, and so on. Further, the device 112 includes a game application 138. The game application 138 may located locally on the device 112, remotely on a server (such as the game services server 116), or partly locally and partly remotely. The game application 138 is a software program that supports participation in a multi-player game with other users. In the embodiment shown in FIG. 2, the device 112 also includes a positioning system 148. The positioning system 148 is a combination of hardware and software components that allows the position of the device 112 to be determined. The positioning system 148 may be a GPS system. In another alternative, the position of the device 112 may be determined remotely, e.g., using signal time-of-arrival, signal triangulation, or another technology. In still another alternative, the position of the device 112 may be determined by having the user input known current position information into the device, e.g., by speaking or using the keypad.

In FIG. 2, the game services server 116 includes the hardware and software suitable for supporting online computer games with multiple, remotely located users. The game services server 116 includes a communications and data exchange system and applications 150. The communications and data exchange system and applications 150 are operable to communicate and exchange data with the multiple game playing devices 112 over the network 118. The game services server 116 includes a game server application 154. The game server application 154 supports one or more multi-player games played by the remotely located users of game playing devices 112. For example, the game server application 154 provides the game scenario, keeps track of players, scores, and so on.

In a present embodiment, the game services server 116 also includes a player position monitoring application 160, a geocoding application 164, and a geographic database 168. The geographic database 168 includes information about the locations of roads, address ranges along roads, buildings, points of interest, businesses, and so on, in the geographic area (100 in FIG. 1). The geocoding application 164 receives data indicative of a user's position and matches the position to a map position. The geocoding application 164 may use the geographic database 168 for this purpose. For example, the geocoding application 164 may receive data generated by the positioning system 148 in a user's game playing device 112 that indicates the user's latitude, longitude, and altitude. Using this information, the geocoding application 164 accesses the geographic database 168 to determine the corresponding street or building location of the user. As an example, the geocoding application 164 may determine that the user operating a game playing device 112 is inside a restaurant located at a particular street address. The geocoding application 164 may also accept data indicating a user's position in different formats. For example, if the user indicates his/her own position audibly or through manual input into a keypad, the geocoding application 164 interprets this input and converts it to a format that is compatible with the data indicating the positions of other users. The geocoding application 164 maintains a temporary data file on the game services server 116 that indicates the current respective location of each user (i.e., game playing device 112) located in the geographic area 100. The geocoding application 164 updates this information regularly, continuously, or as needed.

The player position monitoring application 160 maintains, stores and updates status information about each game playing device 112 located in the geographic area 100. The player position monitoring application 160 obtains the data from the geocoding application 164 that indicates the position of each game playing device 112 located in the geographic area 100. The player position monitoring application 160 also receives data from the game server application 154 to keep track of which users (i.e., which game playing devices) are playing each supported game.

Operation

FIG. 3 shows a process 200 performed by the game services server 116 of FIG. 2. The steps in the process 200 may be performed by one or more of the applications on the game services server 116.

The player position monitoring application 160 obtains information from each of the game playing devices 112 located in the geographic area 100 that indicates the respective position and status of each of the game playing devices 112 (Step 210). The players' positions may be obtained from the positioning system (e.g., 148 in FIG. 2) located in each game playing device 112. The player position monitoring application 160 may query the game playing devices 112 for this information. Alternatively, the game playing device 112 may regularly transmit data indicating its position to the player position monitoring application 160. If the game playing device 112 does not have a positioning system, the user may send information indicating his/her current position to the player position monitoring application 160.

As stated above, the player position monitoring application 160 obtains data that indicates the status of each game playing device 112. The status of a game playing device 112 may include information such as (1) whether the device is being used to currently play an online game, (2) whether the device is not being used to currently play an online game, or (3) whether the user of the device is interested in playing an online game. The player position monitoring application 160 maintains an updatable file or database that stores each user's (i.e., device's) position and status information.

Based on the location and status information about each game playing device 112, the player position monitoring application 160 identifies groups of users of each supported game who are in physical proximity to each other (Step 220). The player position monitoring application 160 may use the geographic database 168 for this purpose. The player position monitoring application 160 stores data that identifies the players, the game, and the location.

The number of players needed to qualify as a group of players in physical proximity to each other is configurable. The number may be based on the type of game being played, the time of day, skill level of the players, etc. Physical proximity may also be configurable. Physical proximity may include being within the same room, within the same building, within the same city block, or physically observable to each other. Physical proximity may also be defined by a physical dimension, such as within 50 meters of a given point, or within a bounded geographic area, e.g., a rectangular area.

FIG. 1 shows two examples of areas where groups of players in proximity to each other have been identified. These areas are labeled 224 and 226.

Referring again to FIG. 3, the player position monitoring application 160 identifies any user (i.e., game playing device) who is physically close to one of the areas that has been identified as including a group of players who are playing an online multi-player computer game in physical proximity to each other (Step 230). The identified user may have previously inquired about the availability of multi-player online games in his/her area. Alternatively, the player may have previously expressed a willingness to receive notification of multi-player online games being played nearby.

Then, the player position monitoring application 160 informs the identified user about the multi-player online computer game being played nearby and inquires whether the user would like to participate (Step 240).

If the user replies affirmatively (Step 250), the player position monitoring application 160 provides the user with information about how to get to the place where the other users are located (Step 260). The information may include directions for traveling to the place or may simply identify the place. The player position monitoring application 160 also transfers information to the game playing application (154 in FIG. 2) to include the user in the game.

Alternatives

In one embodiment disclosed above, it was described how a game services server can support a multi-player online computer game played by users with wireless game playing devices. In an alternative embodiment, a multi-player online computer game may be played by users of wireless game playing devices without having a remotely located game services server. Instead, the game playing devices may operate in a peer-to-peer environment. According to this alternative, the game-related functions that support the multi-player online computer game are performed by some or all of the game playing devices themselves, e.g., in a distributed computing environment. For example, one or more of the wireless game playing devices would perform the functions of handling player participation, location, game scenarios, scoring, etc. According to a further alternative embodiment that uses a peer-to-peer model, each wireless game playing device may contain enough information to query and interact directly with any other devices to which it is in proximity.

In several of the embodiments described above, a user of a wireless game playing device could be informed about a multi-player online computer game being played in proximity to his/her position. As described above, proximity could be determined in various different ways. In another alternative, the proximity of other wireless game playing devices may be based on a virtual location instead of (or in addition to) an actual physical location. As an example, proximity may be determined based on being within a certain distance of a type of location, e.g., 10 meters from any STARBUCKS™ coffee shop. Another virtual proximity may be in region X of mythical planet Y (as determined by a cross reference table to a real world location), or in physically comparable locations (e.g., urban locations, where a Chicago-located mobile game player could compete with another mobile game player in Berlin, but not with a player in Peoria).

In a further alternative, a player's position may not be a real-time position, but instead may be based solely or partially on historical information.

In some of the alternatives, it was described how a game services server (or a peer-to-peer network) could invite a player to play via notification. Another supported feature is having a player who has several different games and is trying to decide which one to play uses a game services server (or a peer-to-peer network) to help determine which one to play. Another feature is to allow a prospective purchaser or player of a multi-player online game to use the proximity feature in a sample or preview mode in order to observe the availability of other players in proximity, e.g., number of players, locations of players, skill level, etc.

In some of the alternatives described above, the game server (or peer-to-peer network) continuously or regularly monitors and tracks each player or device. In another alternative mode of operation, the game server (or peer-to-peer network) may obtain data indicating the locations of players in a snapshot mode, where it simply "pings" all known devices for an instant snapshot of location and game play, with no real-time tracking feature.

According to another alternative feature, if the user who indicates an interest in playing in proximity to other players of an online game is already in physical proximity to the other players, the position monitoring application informs the user of this fact.

For purposes of this disclosure, online games may include community games, location-based games and location-aware games, as well as any other type of online computer game.

The embodiments described herein are not limited to only games played by players with portable game playing devices. The embodiments may include games played by a combination of users with mobile game playing devices and users with non-mobile (including non-portable) game playing devices.

According to another feature, if several portable game playing devices are not located physically close together, a suitable available location to meet may be determined (e.g., by the player monitoring application) and then each of the users of the portable game playing devices may be notified of the availability of such a place, along with directions for traveling to the place.

In a further alternative, a user of a wireless portable game playing device could be informed about the density of other game players located physically close together. This density information could be provided instead of, or in addition to, information about the number or locations of other game players. The density information may be real-time information, i.e., information about the current density of other game players who are playing a game in proximity to each other, or the density information may be historical information, i.e., information about the density of other game players who played a game in proximity to each other at some previous time. The historical density information may be provided with information about the historical time, e.g., Fridays, after 6:00 PM.

The embodiments disclosed herein provide a feature that informs a user of a wireless game playing device about other players in his/her vicinity. The feature may be applied to social networking applications and athletic applications.

The embodiments described herein enhance the experience of playing multi-player online computer games, particularly with portable game playing devices. By facilitating users to physically congregate, playing experiences can be improved.

It is intended that the foregoing detailed description be regarded as illustrative rather than limiting and that it is understood that the following claims including all equivalents are intended to define the scope of the invention.

We claim:

1. A computer-implemented method of operation for a multi-player online computer game played by users on portable wireless game-playing devices, wherein each of the portable wireless game-playing devices is located at a respective corresponding physical geographic position, the method comprising:
   receiving, via a server, information that indicates the respective corresponding physical geographic position of each of the portable wireless game-playing devices;
   storing, via the server, the received information on a hardware medium;
   identifying, via the server, a group of users currently playing the same multi-player online computer game with each other on respective portable wireless game-playing devices within a predetermined distance from each other; then
   identifying, via the server, another portable wireless game-playing device outside of an area in which the group of users are currently playing the same multi-player online computer game within the predetermined distance from each other, the identifying being based on a distance between the physical geographic position of the other portable wireless game-playing device and the area in which the group of users are within the predetermined distance from each other; and
   if the other portable wireless game-playing device outside of the area is identified, using, via the server, the received information to bring the user of the other portable wireless game-playing device outside of the area within the area to play the same multi-player online computer game on the respective portable wireless game-playing device with the other users,
   wherein using the information to bring the user within the area includes providing information to the portable wireless game-playing device of the user that indicates how the user can come within the predetermined distance from the other users, and
   wherein the multi-player online computer game comprises pre-defined game scenarios and a scoring system.

2. The method of claim 1 wherein providing the information includes indicating a location where another user is located.

3. The method of claim 2 further comprising:
   providing, via the server, instructions to the user to travel to the location where the other users are located.

4. The method of claim 1 wherein the server comprises a game services server.

5. The method of claim 1 wherein the multi-player online computer game is an athletic game.

6. The method of claim 1 further comprising:
   obtaining, via the server, information that indicates a skill level of the user of the other portable wireless game-playing device outside of the area; and
   using, via the server, the skill level as a factor when identifying the other portable wireless game-playing device outside of the area.

7. The method of claim 1 wherein the multi-player online computer game is also being played by users on non-portable game-playing devices.

8. The method of claim 1 further comprising:
   using, via the server, the information that indicates the respective corresponding physical geographic position of each of the portable wireless game-playing devices to determine a density of users of portable wireless game-playing devices in the area; and providing, via the server, information about the density to the user of one of the portable wireless game-playing devices.

9. The method of claim 1 wherein the identifying is further based on an indication of interest to play the multi-player online computer game.

10. The method of claim 1 wherein the predetermined distance is at most 50 meters.

11. A system for playing a multi-player online computer game played by users on portable wireless game-playing devices, the system comprising:

a game services server; and an application on the game services server that maintains information indicating current physical positions of the portable wireless game-playing devices and adapted to:

identify one or more users currently playing a same multi-player online computer game on respective portable wireless game-playing devices within an area having predetermined dimensions, then identify another portable wireless game-playing device outside of the area having the predetermined dimensions in which the one or more users are currently playing the same multi-player online computer game, the identifying of the other portable wireless game-playing device being based on a distance between the physical position of the other portable wireless game-playing device and the area having the predetermined dimensions, and if the other portable wireless game-playing device outside of the area having predetermined dimensions is identified, invite the user of the other portable wireless game-playing device to be within the area having the predetermined dimensions to play the same multi-player online computer game with the other one or more users on the respective portable wireless game-playing devices within the predetermined dimensions, wherein the multi-player online computer game comprises pre-defined game scenarios and a scoring system.

12. The system of claim 11 wherein the application is further adapted to identify to the user a place where the other one or more users are located.

13. The system of claim 11 wherein to invite includes to provide to the portable wireless game-playing device of the user directions for traveling.

14. The system of claim 11 wherein the multi-player online computer game is an athletic game.

15. The system of claim 11 wherein the application is further adapted to:

obtain information that indicates a skill level of the user of the other portable wireless game-playing device outside of the area having the predetermined dimensions, and use the skill level as a factor when identifying the other portable wireless game-playing device outside of the area.

16. The system of claim 11 wherein the identifying of the other portable wireless game-playing device outside of the area is further based on an indication of interest to play the multi-player online computer game.

17. The system of claim 11 wherein the predetermined dimensions include a distance of at most 50 meters.

* * * * *